United States Patent
Yane et al.

(10) Patent No.: US 11,619,892 B2
(45) Date of Patent: Apr. 4, 2023

(54) RESIN MOLDED PRODUCT, RESIN LAMINATE, CARTRIDGE, IMAGE-FORMING APPARATUS, METHOD FOR MANUFACTURING RESIN MOLDED PRODUCT, METHOD FOR MANUFACTURING RESIN LAMINATE, AND METHOD FOR MANUFACTURING CARTRIDGE

(71) Applicant: CANON KABUSHIKI KAISHA, Tokyo (JP)

(72) Inventors: Akira Yane, Tokyo (JP); Daisuke Kurihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 170 days.

(21) Appl. No.: 16/457,625

(22) Filed: Jun. 28, 2019

(65) Prior Publication Data

US 2020/0012211 A1    Jan. 9, 2020

(30) Foreign Application Priority Data

Jul. 5, 2018    (JP) .............................. JP2018-128438
Jul. 5, 2018    (JP) .............................. JP2018-128439
May 17, 2019   (JP) .............................. JP2019-094048

(51) Int. Cl.
| | | |
|---|---|---|
| G03G 15/08 | (2006.01) | |
| C08K 3/04 | (2006.01) | |
| B32B 27/08 | (2006.01) | |
| B32B 27/30 | (2006.01) | |
| B32B 27/20 | (2006.01) | |
| H01B 1/24 | (2006.01) | |
| B29B 7/90 | (2006.01) | |
| B29B 11/10 | (2006.01) | |
| B29C 45/00 | (2006.01) | |
| B29C 45/14 | (2006.01) | |
| B29C 48/00 | (2019.01) | |
| C08F 210/02 | (2006.01) | |
| B29L 9/00 | (2006.01) | |
| B29K 25/00 | (2006.01) | |
| B29K 23/00 | (2006.01) | |
| B29K 507/04 | (2006.01) | |

(52) U.S. Cl.
CPC .......... G03G 15/0849 (2013.01); B29B 7/90 (2013.01); B29B 11/10 (2013.01); B29C 45/0001 (2013.01); B29C 45/14 (2013.01); B29C 48/022 (2019.02); B32B 27/08 (2013.01); B32B 27/20 (2013.01); B32B 27/302 (2013.01); B32B 27/306 (2013.01); C08F 210/02 (2013.01); C08K 3/04 (2013.01); H01B 1/24 (2013.01); B29K 2023/083 (2013.01); B29K 2025/06 (2013.01); B29K 2507/04 (2013.01); B29K 2995/0005 (2013.01); B29L 2009/00 (2013.01); C08F 2800/20 (2013.01); C08K 2201/001 (2013.01); C08K 2201/005 (2013.01); C08K 2201/011 (2013.01)

(58) Field of Classification Search
None
See application file for complete search history.

(56) References Cited

U.S. PATENT DOCUMENTS

| | | | | |
|---|---|---|---|---|
| 6,001,207 A | * | 12/1999 | Enlow | B32B 27/08 |
| | | | | 156/230 |
| 2010/0078194 A1 | * | 4/2010 | Bhatt | C08K 3/04 |
| | | | | 174/110 SR |

FOREIGN PATENT DOCUMENTS

| | | | |
|---|---|---|---|
| CN | 1280393 A | | 1/2001 |
| CN | 1771289 A | | 5/2006 |
| CN | 101501136 A | | 8/2009 |
| CN | 104231411 A | | 12/2014 |
| JP | 61-101554 A | | 5/1986 |
| JP | 2001115791 A | * | 4/2001 |
| JP | 2001-302856 A | | 10/2001 |
| JP | 2008063562 A | * | 3/2008 |
| JP | 2015-34984 A | | 2/2015 |
| JP | 2017-095609 A | | 6/2017 |

OTHER PUBLICATIONS

Hirasawa, Eisaku, JP2001115791A, Waterproof sheet for tunnel, Apr. 24, 2001 (Machine translation) (Year: 2001) (Year: 2001).*
Kamei et al., JP-2008063562-A, Mar. 21, 2008 (machine translation) (Year: 2008).*
Lan-Ting, L. et al., "Woodworking Materials", Mar. 31, 1992.
De, S.Z., et al., "Light Stabilizer and It's Application Technology", Jan. 31, 2010.

* cited by examiner

*Primary Examiner* — Cheng Yuan Huang
(74) *Attorney, Agent, or Firm* — Canon U.S.A., Inc., IP Division

(57) ABSTRACT

A resin molded product whose main component consists of an ethylene-vinyl acetate copolymer resin and carbon black. The ethylene-vinyl acetate copolymer resin has an MFR of 0.5 g/10 min or more and 20 g/10 min or less. The carbon black has an average primary particle diameter of 55 nm or more and 100 nm or less and a DBP oil absorption amount of 100 mL/100 g or more and 300 mL/100 g or less. The content of vinyl acetate is 2.9 parts by mass or more and 12.3 parts by mass or less based on 100 parts by mass of the main component. The resin molded product has a surface resistivity of 720 Ω/☐ or less.

9 Claims, 3 Drawing Sheets

RESIN MOLDED PRODUCT, RESIN LAMINATE, CARTRIDGE, IMAGE-FORMING APPARATUS, METHOD FOR MANUFACTURING RESIN MOLDED PRODUCT, METHOD FOR MANUFACTURING RESIN LAMINATE, AND METHOD FOR MANUFACTURING CARTRIDGE

BACKGROUND OF THE INVENTION

Field of the Invention

The present disclosure relates to a resin molded product useful as a conductor utilizing high conductivity for conductive members of a variety of electronic equipment, such as laser printers, digital single lens reflex cameras, compact digital cameras, smartphones, and personal computers, and also relates to a resin laminate using the resin molded product, and also relates to a cartridge using the resin laminate.

Description of the Related Art

Resin molded products having high conductivity have been widely used as conductive members, replacing for metals, of, for example, digital single lens reflex cameras, compact digital cameras, smartphones, and personal computers. In addition, in response to increases in complexity, precision, and miniaturization of electronic equipment, the resin molded products are required to have higher conductivity.

As a resin molded product having conductivity, for example, Japanese Patent Laid-Open No. 2015-105980 describes a use of a conductive resin sheet made of a mixture of an ethylene-vinyl acetate copolymer resin and carbon black as a laser printer electrostatic capacitance detection member. Here, carbon black is mixed for enhancing the conductivity, and in order to enhance the conductivity of the resin molded product, it is required to form a sheet by mixing and dispersing a larger amount of carbon black. In addition, in Japanese Patent Laid-Open No. 2015-105980, the conductive resin sheet made of a mixture of an ethylene-vinyl acetate copolymer resin and carbon black is provided on a polystyrene resin.

However, if a large amount of carbon black is mixed and dispersed in an ethylene-vinyl acetate copolymer resin, the carbon black may aggregate. If the carbon black aggregates, it is difficult to manufacture a sheet-like resin molded product having a uniform film thickness, and a portion having a significantly small film thickness is generated, which may make a hole in the sheet with this portion as the starting point. In contrast, if the content of the carbon black is low, the conductive path by contact between carbon black particles is broken, and desired conduction characteristics are difficult to be provided. That is, high conductivity and good sheet-like shape cannot be obtained only by adjusting the content of carbon black. In addition, the adhesion between the polystyrene resin and the ethylene-vinyl acetate copolymer resin is insufficient, which causes a disadvantage of easily causing peeling at the interface between the both the resins.

SUMMARY OF THE INVENTION

The resin molded product for dissolving the above-mentioned disadvantages is a resin molded product whose main component consists of an ethylene-vinyl acetate copolymer resin and carbon black. The ethylene-vinyl acetate copolymer resin has a melt flow rate (MFR) of 0.5 g/10 min or more and 20 g/10 min or less, and the carbon black has an average primary particle diameter of 55 nm or more and 100 nm or less and a dibutyl phthalate (DBP) oil absorption amount of 100 mL/100 g or more and 300 mL/100 g or less. The content of the vinyl acetate is 2.9 parts by mass or more and 12.3 parts by mass or less based on 100 parts by mass of the main component, and the surface resistivity of the resin molded product is 720 Ω/□ or less.

Further features of the present disclosure will become apparent from the following description of exemplary embodiments with reference to the attached drawings.

DESCRIPTION OF THE EMBODIMENTS

First Embodiment

Resin Molded Product

Figure 1:
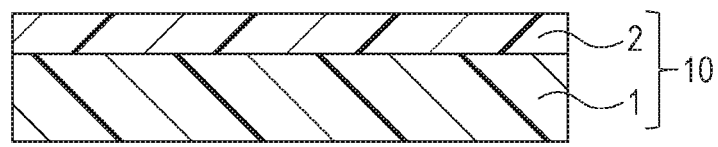
FIG. 1 is a schematic view illustrating an aspect of the resin laminate of the present disclosure.

A First Embodiment relates to a resin molded product that is suitable to be formed into a sheet shape and can achieve both high conductivity and a uniform film thickness when formed into a sheet-like molded product.

The resin molded product of a First Embodiment comprises a main component consisting of an ethylene-vinyl acetate copolymer resin and carbon black. In the present specification, the term of "main component" or "mainly composed of" means that the content of the main component is 80 parts by mass or more based on 100 parts by mass of the resin molded product. That is, the resin molded product of the present disclosure is mainly composed of an ethylene-vinyl acetate copolymer resin and carbon black mixed and dispersed therein, and may contain components other than the main component within a range that can achieve both conductivity and moldability.

The ethylene-vinyl acetate copolymer resin contained in the resin molded product of the First Embodiment is a resin represented by structural Formula 1:

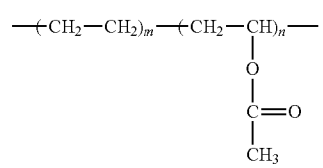

(Structural Formula 1)

The ethylene-vinyl acetate copolymer resin contained in the resin molded product of the First Embodiment has an MFR of 0.5 g/10 min or more and 20 g/10 min or less. Here, MFR is an abbreviation for Melt Flow Rate and is a value indicating fluidity of a synthetic resin in molding, and a larger value indicates higher fluidity. When the ethylene-vinyl acetate copolymer resin in the resin molded product of the First Embodiment has an MFR within the above-mentioned range, the thickness of the molded product can be controlled within ±20%. In contrast, if the MFR is less than 0.5 g/10 min, since the viscosity of the resin is high, it is difficult to manufacture a sheet-like resin molded product with a uniform thickness. In addition, if the MFR is higher than 20 g/10 min, since the molecular weight is small, the melt tension of the resin falls, causing a difficulty in making the thickness uniform. The MFR is particularly desirably 0.8 g/10 min or more and 20 g/10 min or less, and within this range, a sheet can be easily molded with a film thickness of less irregularity.

The rate of the vinyl acetate in the ethylene-vinyl acetate copolymer resin contained in the resin molded product of the First Embodiment can be 5 parts by mass or more and 20 parts by mass or less based on 100 parts by mass of the ethylene-vinyl acetate copolymer resin. Within this range, it is possible to ensure uniformity of the thickness of a sheet shape while maintaining high conductivity. In contrast, if the rate is less than 5 parts by mass, the modulus of elasticity of the resin is increased to lose the flexibility, resulting in a risk of piercing the sheet-like molded product during manufacturing. In addition, if the rate is higher than 20 parts by mass, the affinity between the resin and the carbon black is too high, and the aggregates of the carbon black are destroyed by the shearing force applied to the resin during sheet processing, resulting in a risk of a reduction in conductivity.

The content of the vinyl acetate contained in the resin molded product of the First Embodiment is 2.9 parts by mass or more and 12.3 parts by mass or less based on 100 parts by mass of the total amount of the ethylene-vinyl acetate copolymer resin and carbon black as the main component. Within this range, it is possible to ensure uniformity of the thickness of a sheet shape while maintaining high conductivity. If the content is less than 2.9 parts by mass, the modulus of elasticity of the resin is increased to lose the flexibility, and manufacturing of a sheet-like molded product is not easy. In addition, if the content is higher than 12.3 parts by mass, the affinity between the resin and the carbon black is too high, and the aggregates of the carbon black are destroyed by the shearing force applied to the resin during sheet processing, resulting in a reduction in conductivity. From the viewpoint of conductivity, the content is more preferably 2.9 parts by mass or more and 11.4 parts by mass or less.

The content of the carbon black contained in the resin molded product of the First Embodiment can be 35 parts by mass or more and 50 parts by mass or less based on 100 parts by mass of the main component. If the content is less than 35 parts by mass, it is difficult to form a sufficient conductive path in the resin molded product, resulting in a risk of failing in obtaining high conductivity. In contrast, if the content is higher than 50 parts by mass, since the content of the carbon black in the main component is too high, aggregates are easily formed, which causes occurrence of film thickness irregularity and makes a hole in the sheet in the vicinity of the aggregates. The content is more preferably 42 parts by mass or more and 45 parts by mass or less.

The DBP oil absorption amount of the carbon black contained in the resin molded product of the First Embodiment is 100 mL/100 g or more and 300 mL/100 g or less. The DBP oil absorption amount is an indicator showing the structure of carbon black, and a larger value means that the carbon black absorbs a larger amount of DBP and has a developed structure. Incidentally, DBP is an abbreviation for dibutyl phthalate, which is one of plasticizers. When the DBP oil absorption amount is within this range, the resin molded product can ensure uniformity of the thickness of a sheet shape while maintaining high conductivity. In contrast, if the amount is less than 100 mL/100 g, it is difficult to form a sufficient conductive path in the resin molded product, resulting in failure in obtaining high conductivity. If the amount is higher than 300 mL/100 g, the structure of the carbon black becomes too large and increases interaction between carbon black particles to increase the viscosity of the resin, resulting in difficulty in sheet processing. The amount is more preferably 142 mL/100 g or more and 152 mL/100 g or less.

The carbon black contained in the resin molded product of the First Embodiment has an average primary particle diameter of 55 nm or more and 100 nm or less. Within this range, the resin molded product can ensure uniformity of the thickness of a sheet shape. In contrast, if the average primary particle diameter is smaller than 55 nm, since the surface area of the carbon black becomes large to increase the contact area between the resin and the carbon black, the viscosity of the resin increases, resulting in a difficulty in obtaining a uniform thickness at the time of molding the sheet. If the average primary particle diameter is larger than 100 nm, the aggregates also become large due to the large particle diameter, which causes occurrence of film thickness irregularity and makes a hole in the sheet in the vicinity of the aggregates. The average primary particle diameter is more preferably 55 nm or more and 72 nm or less. Incidentally, the average primary particle diameter of carbon black can be determined, for example, from an image taken with an electron microscope, such as a TEM or an SEM.

The carbon black contained in the resin molded product of the First Embodiment can be any of, for example, furnace black, channel black, acetylene black, and ketjen black. These carbon blacks can be manufactured by, for example, a channel method, a furnace method, an acetylene method, or a thermal method. Examples of commercially available carbon black include MA-7, MA-100, #970, #2200, and #2600 (which are manufactured by Mitsubishi Chemical Corporation); Special Black-5, Special Black-100, Color Black S-170, and Printex 140V (which are manufactured by Evonik Deggussa Japan Co., Ltd.); Neo-Spectra Mark I and Neo-Spectra Mark V (which are manufactured by Columbian Carbon Japan, Ltd.); and Seast, Toka Black, and Thermal Black (which are manufactured by Tokai Carbon Co., Ltd.). The carbon black is more preferably furnace black. These carbon blacks may be used alone or in combination of two or more thereof.

In order to adjust a variety of characteristics, the resin molded product of the First Embodiment can contain 20 parts by mass or less of a variety of additives other than the ethylene-vinyl acetate copolymer resin and carbon black within a range that does not vary the conductivity and the moldability. The additives are, for example, a variety of additives that are used in thermoplastic resins, such as resins, fillers, dispersants, oxidation inhibitors, weather-resistant agents, and stabilizing agents.

Although any resin may be added to the resin molded product, for example, one or more selected from the group consisting of polycarbonate resins; styrene resins; acrylic resins; vinyl chloride resins; styrene-vinyl acetate copolymers; vinyl chloride-vinyl acetate copolymers; polyolefin resins, such as polyethylene, polypropylene, and polybutadiene; polyester resins, such as polyethylene terephthalate (PET) and polybutylene terephthalate (PBT); polyvinylidene chloride; ionomer resins; polyurethane resins; silicone resins; fluororesins, such as polyvinylidene fluoride (PVdF) resin and ethylene-tetrafluoroethylene copolymer (ETFE); ethylene-ethyl acrylate copolymers; ethylene-vinyl alcohol copolymers; polyamide resins; polyimide resins; and modified polyphenylene oxide resins; and modified resins thereof can be used. However, the resin is not limited to these resins.

In addition, the resin molded product of the First Embodiment may contain a thermoplastic elastomer according to the use. Although any thermoplastic elastomer can be used, examples thereof include polystyrene elastomers, polyolefin elastomers, polyester elastomers, polyurethane elastomers, polyamide elastomers, and fluoropolymer elastomers.

Although the resin molded product may contain any filler, such as an inorganic filler or an organic filler. Examples of the inorganic filler include mica, glass fibers, glass balls, cryolites, zinc oxide, titanium oxide, calcium carbonate, clays, talc, silica, wollastonite, zeolite, diatomite, silica sand, pumice powder, slate powder, alumina, alumina white, aluminum sulfate, barium sulfate, lithopone, calcium sulfate, and molybdenum disulfide.

As the organic filler, one or more fillers can be appropriately selected from, for example, tetrafluoroethylene resin particles, trifluorochloroethylene resin particles, tetrafluoroethylene hexafluoropropylene resin particles, vinyl fluoride resin particles, vinylidene fluoride resin particles, difluorodichloroethylene resin particles and copolymers thereof, fluorocarbon, silicone resin particles, silicone compound rubber powders, such as silicone rubber particles, ebonite powder, ceramic, wood powder, coconut palm powder, cork powder, cellulose powder, and wood pulp.

The surface resistivity of the resin molded product of the First Embodiment can be 720 Ω/□ or less. When the surface resistivity is 720 Ω/□ or less, the resin molded product can be suitably used as a conductive member. The surface resistivity is more preferably 650 Ω/□ or less.

The thickness of the resin molded product of the First Embodiment can be 30 μm or more and 200 μm or less. When the thickness is within this range, the resin molded product can be suitably used in a variety of electronic equipment.

Method for Manufacturing Resin Molded Product

A method for manufacturing the resin molded product of the present disclosure will now be described.

A resin composition is prepared by mixing carbon black and an ethylene-vinyl acetate copolymer resin such that the content of vinyl acetate is 2.9 parts by mass or more and 12.3 parts by mass or less based on 100 parts by mass of the total of the ethylene-vinyl acetate copolymer resin and the carbon black.

Here, the carbon black has an average primary particle diameter of 55 nm or more and 100 nm or less and a DBP oil absorption amount of 100 mL/100 g or more and 300 mL/100 g or less. In addition, the ethylene-vinyl acetate copolymer resin has an MFR of 0.5 g/10 min or more and 20 g/10 min or less.

The mixing method is not particularly limited, and examples thereof include a method in which a resin composition is molten and applied with shearing force using a screw or blade, such as a two-screw extruder or a kneader and a method in which a resin composition passes between a plurality of rollers in close proximity, as in a roll mill, to melt and apply shearing force to the resin composition. In addition, the examples include a method in which the resin composition applied with shearing force is formed into pellets by continuously extruding the resin composition into a strand and cutting the strand in pieces and a method in which the resin composition taken out as a mass is pulverized with a pulverizer, but the method is not limited thereto.

Subsequently, a resin molded product can be obtained by molding the resin composition. Examples of the method for preparing a resin molded product of the present disclosure include an extrusion molding method in which a resin composition is plasticized with a screw, the plasticized resin is extruded from a mouthpiece and widened into a sheet, and the sheet is taken with rollers; inflation molding in which a plasticized resin is extruded from a cylindrical mouthpiece and is blown into a cylindrical shape with air, and the cylindrical sheet is continuously taken out; and calender molding in which a resin composition is molten on two rollers and is drawn through multiple rollers into a sheet having a desired film thickness. Among these methods, extrusion molding is particularly preferred.

Second Embodiment

A Second Embodiment relates to a resin laminate in which a resin layer made of a resin molded product is provided on a base material made of a polystyrene resin.

Resin Laminate

FIG. 1 is a schematic view illustrating an aspect of the resin laminate as the Second Embodiment. The resin laminate 10 includes a base material 1 made of a polystyrene resin and a resin layer 2 disposed on the base material and mainly composed of an ethylene-vinyl acetate copolymer resin and carbon black mixed therein. In addition, a resin layer can be further provided on the resin layer 2. Thus, two or more resin layers may be provided.

Here, the base material 1 may have any thickness t1, and the resin layer 2 may have any thickness t2. Specifically, the thickness t1 of the base material 1 is, for example, 300 μm or more and 1 mm or less, and the thickness t2 of the resin layer 2 is, for example, 50 μm or more and 200 μm or less. When the base material 1 and the resin layer 2 have thicknesses within these ranges, the strength of the whole resin laminate is sufficient. In addition, the ratio of the thicknesses, t1/t2, is for example, 1.5 or more and 20 or less. If the thickness ratio between the base material 1 and the resin layer 2 is within this range, it is possible to reduce the stress applied to the resin layer due to the different coefficients of linear expansion of the base material 1 and the resin layer 2.

The base material 1 is made of a polystyrene resin. Here, the polystyrene resin has a structure represented by Structural Formula 2:

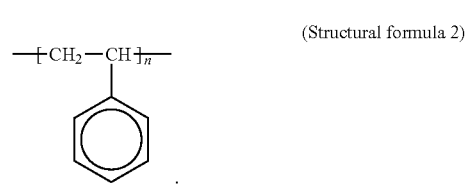

(Structural formula 2)

The polystyrene resin material used in the Second Embodiment is not particularly limited and may be, for example, a general-purpose polystyrene resin (GPPS resin) or a high-impact polystyrene resin (HIPS resin) containing a GPPS resin and a rubber elastic member. The polystyrene resin may be a commercially available product or a mixture thereof. Examples of the commercially available polystyrene resin include Toyo Styrol series (manufactured by Toyo Styrene Co., Ltd.) and PSJ-Polystyrene series (manufactured by PS Japan Corporation). These polystyrene resins may be used alone or in combination of two or more thereof. The polystyrene resin is more preferably a high-impact polystyrene resin (HIPS).

In the high-impact polystyrene resin, a rubber elastic member is generally polymerized with or dispersed in polystyrene in order to improve the impact resistance of the polystyrene resin. The rubber elastic member is not particularly limited, and examples thereof include butadiene rubber, styrene-butadiene rubber, acrylic rubber, acrylonitrile-butadiene rubber, and natural rubber. As the high-impact polystyrene resin, for example, NORYL series (manufactured by Saudi Basic Industries Corporation) and Dicstyrene HIPS series (manufactured by DIC Corporation) are available.

The base material 1 may be manufactured by any method (molding method) and can be molded by a general method, such as extrusion molding, injection molding, press molding, or inflation molding.

The resin layer 2 is made of a resin molded product in which carbon black is dispersed in an ethylene-vinyl acetate copolymer resin of the First Embodiment.

The ethylene-vinyl acetate copolymer resin contained in the resin layer 2 of the Second Embodiment can have an MFR of 0.5 g/10 min or more and 20 g/10 min or less. When the MFR of the ethylene-vinyl acetate copolymer resin in the resin layer 2 is within the above-mentioned range, the resin layer 2 has high fluidity, and the ethylene-vinyl acetate copolymer resin has a long polymer chain length. Accordingly, the ethylene-vinyl acetate copolymer resin has high fluidity and excellent moldability. In addition, the long polymer chain is apt to entangle with the polymer chain of the polystyrene resin. Accordingly, a resin laminate having excellent molding accuracy and sufficient adhesive strength can be provided.

In contrast, if the MFR of the ethylene-vinyl acetate copolymer resin is higher than 20 g/10 min, since the polymer chain length of the ethylene-vinyl acetate copolymer resin is short, the entangling with the polymer chain of the polystyrene resin is insufficient, and the adhesion may be insufficient. If the MFR of the ethylene-vinyl acetate copolymer resin is lower than 0.5 g/10 min, since the ethylene-vinyl acetate copolymer resin has an increased viscosity and reduced fluidity, molding may be difficult.

Method for Manufacturing Resin Laminate

A method for manufacturing a resin laminate of the Second Embodiment will now be described. FIGS. 2A to 2D are schematic views illustrating an aspect of the method for manufacturing a resin laminate.

A sheet-like resin molded product described in the paragraph of the First Embodiment is prepared. The resulting resin molded product is placed in a mold, and a molten polystyrene resin is then injected into the mold to form a resin laminate by insert molding.

Figure 2D:
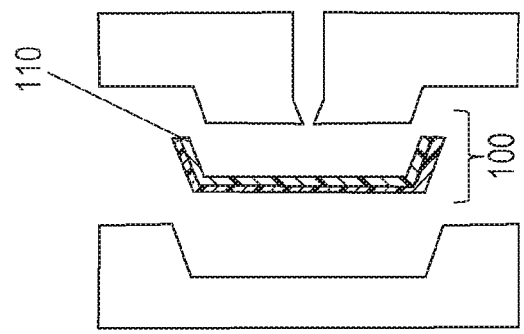
FIGS. 2A to 2D are schematic views illustrating an aspect of the method for manufacturing a resin laminate of the present disclosure.
Figure 2C:
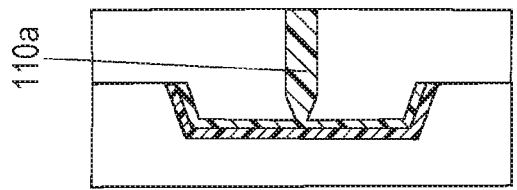
Figure 2B:
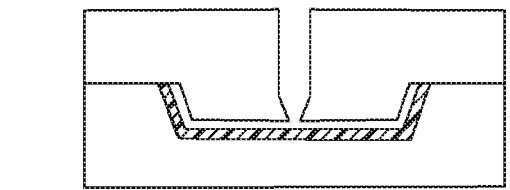
Figure 2A:
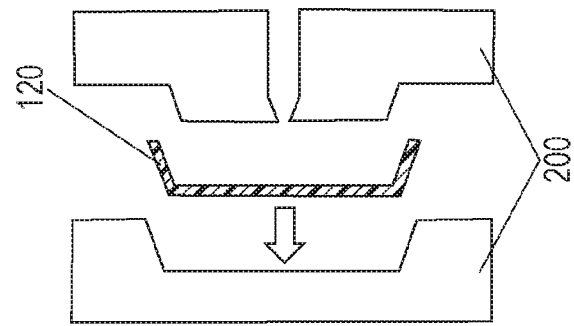

Specifically, as shown in FIG. 2A, a sheet-like resin molded product 120 is placed in a mold 200. Subsequently, as shown in FIG. 2B, the mold 200 is closed. Furthermore, as shown in FIG. 2C, a molten polystyrene resin 110a as the material of a base material is injected into the mold. Then, as shown in FIG. 2D, the solidified polystyrene resin 110 is released from the mold 200 to obtain a resin laminate 100.

Although the molding conditions for preparing the resin laminate are not particularly limited, it is necessary to form a structure in which the polymer chain of the ethylene-vinyl acetate copolymer resin and the polymer chain of the polystyrene resin are mutually interfere for obtaining high adhesion. Accordingly, it is necessary to thermally fuse at least the surfaces of the polystyrene resin and the ethylene-vinyl acetate copolymer resin at the time when the polystyrene resin and the ethylene-vinyl acetate copolymer resin adhere to each other.

A base material 110 made of a polystyrene resin and a resin layer 120 mainly composed of an ethylene-vinyl acetate copolymer resin and carbon black dispersed therein may be molded separately. Then, a resin molded product mainly composed of an ethylene-vinyl acetate copolymer resin and carbon black dispersed therein may be provided on the resulting base material 110 to form a resin layer 120. An adhesive may be provided between the resin layer 120 and the base material 110, or the resin layer 120 may be mounted on and thermocompression-bonded to the base material 110.

Cartridge

The resin laminate of the present disclosure can be used in a conductive part that has been a metal member before. Specifically, a metal plate used in a cartridge can be replaced by the resin laminate of the present disclosure. The resin laminate of the present disclosure can be suitably used as the electrostatic capacitance detection member of a cartridge.

Figure 3:
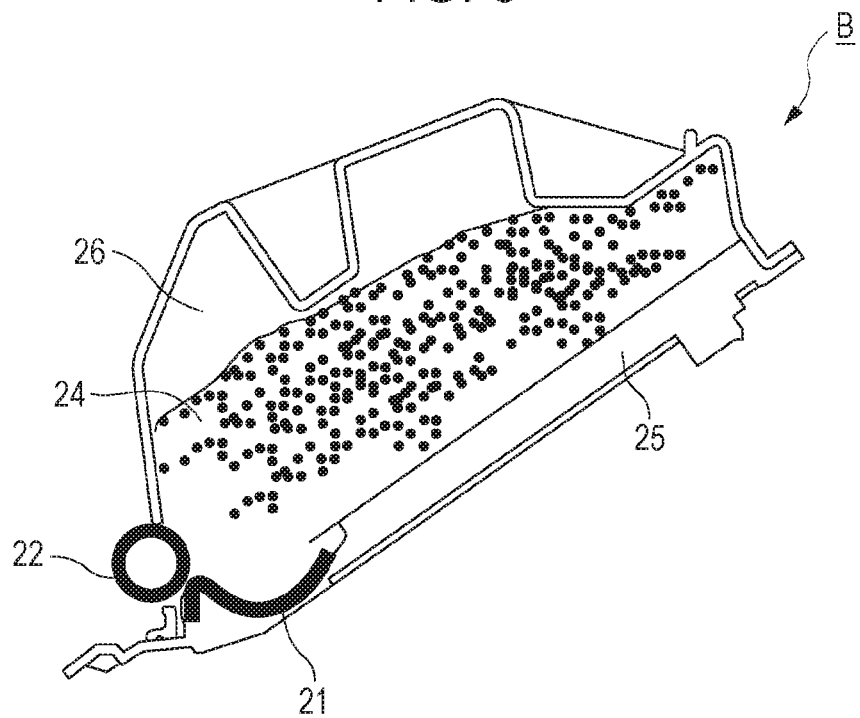
FIG. 3 is a schematic cross-sectional view illustrating an aspect of the cartridge of the present disclosure.

The cartridge of the present disclosure will be described with the schematic cross-sectional view shown in FIG. 3.

The electrostatic capacitance detection member 21 is made of a resin layer mainly composed of an ethylene-vinyl acetate copolymer resin and carbon black and is integrally molded with a frame 25 on the frame. Here, the frame 25 is made of a polystyrene resin. In addition, the electrostatic capacitance detection member 21 includes a contact member (not shown). The contact member is provided for electrical connection with external equipment. The developer storage part 26 stores a developer and is fixed to the frame 25 by means of, for example, bonding. In this example, toner 24 is used as the developer. The cartridge B includes a developing roller 22. Since the electrostatic capacitance detection member 21 has conductivity, the electrostatic capacitance between the electrostatic capacitance detection member 21 and the developing roller 22 can be detected accurately. Accordingly, a change in the electrostatic capacitance by a change in the amount of the toner 24 existing in the developer storage part 26 can be detected accurately.

Image-Forming Apparatus

Figure 4:
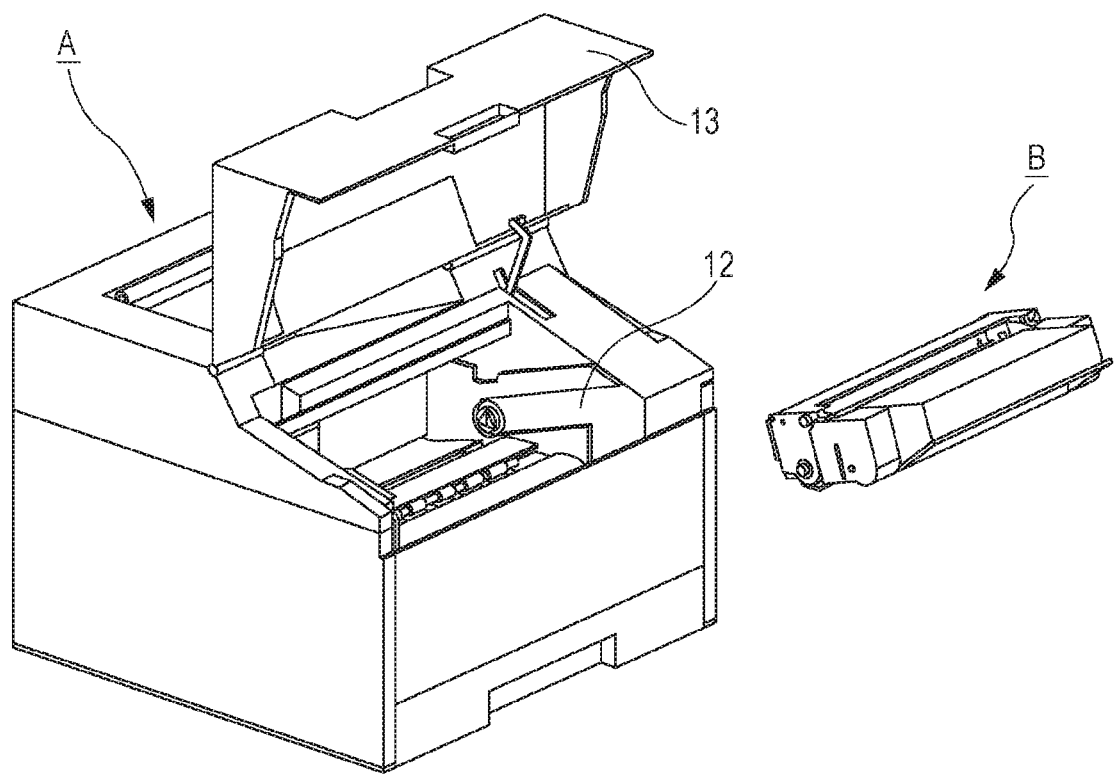
FIG. 4 is a schematic view illustrating an aspect of the image-forming apparatus of the present disclosure.

FIG. 4 is a schematic view illustrating an aspect of the image-forming apparatus of the present disclosure. The image-forming apparatus A includes an openable door 13 for attaching and detaching the cartridge B. FIG. 4 shows a state in which the openable door 13 is opened. The cartridge B is mounted on the image-forming apparatus A along the guide rail 12, and the contact member of the cartridge B is electrically connected to a developer residual amount detecting unit (not shown) present in the image-forming apparatus A. In such a configuration, the image-forming apparatus A of the present disclosure accurately detects the amount of the toner 24 remaining in the cartridge B and can display the amount.

Method for Evaluation

A method for measuring a resin molded product of the present disclosure will now be shown.

Method for Measuring MFR of Ethylene-Vinyl Acetate Copolymer Resin

The MFR of the ethylene-vinyl acetate copolymer resin was measured using an MFR measuring apparatus (MeltIndexer G-01) manufactured by Toyo Seiki Seisaku-sho, Ltd. by a method in accordance with JIS K 7210 under conditions of 190° C. and 2.16 kgf.

Method for Measuring Vinyl Acetate Content

The content of the vinyl acetate was analyzed using a thermogravimetric analyzer (TGA) (manufactured by METTLER TOLEDO, trade name: TGA851). When the ethylene-vinyl acetate copolymer resin is heated in a nitrogen atmosphere, an elimination reaction of acetic acid from the vinyl acetate part occurs at about 270° C. to 390° C., and a decomposition reaction of the main chain occurs at about 390° C. to 500° C. The ethylene-vinyl acetate copolymer resin was heated in a nitrogen atmosphere from 25° C. to 500° C. at a rate of at 2° C./min with the TGA. The content of vinyl acetate was calculated from the weight reduction percentage (%), X1, observed during from 270° C. to 390° C. and the weight reduction percentage (%), X2, observed during from 25° C. to 500° C. by Expression 1:

$$\text{Vinyl acetate content}(\%) = \frac{X1}{X1+X2} \times 1.43 \times 100. \quad (1)$$

When the ethylene-vinyl acetate copolymer resin contains multiple components, the measurement was performed after separation by a method such as gel permeation chromatography (GPC).

Method for Measuring DBP Oil Absorption Amount of Carbon Black

The DBP oil absorption amount of the carbon black was measured with an oil absorption amount measuring apparatus (S-500) manufactured by Asahisouken Corporation by a method in accordance with JIS Z 8901.

Method for Measuring Average Primary Particle Diameter of Carbon Black

The average primary particle diameter of the carbon black was measured from a TEM image. The procedure is shown below.

Carbon black dispersed in a water-soluble resin was put in a cryo-microtome (ULTRACUT UCT, manufactured by Leica Microsystems GmbH) apparatus. The apparatus was cooled to −80° C. by liquid nitrogen to freeze the water-soluble resin in which carbon black was dispersed. Subsequently, the frozen water-soluble resin was trimmed with a glass knife to form a cut surface shape having a width of about 0.1 mm and a length of about 0.2 mm. Furthermore, an ultra-thin section (thickness setting: 70 nm) of the carbon black including the water-soluble resin was produced using a diamond knife and was transferred on a grid mesh for TEM observation with an eyelash probe. The ultra-thin section of carbon black particles including the water-soluble resin was cooled to room temperature, and the water-soluble resin was then dissolved in pure water to prepare a sample for observation with a transmission electron microscope (TEM).

The observation sample was observed with a transmission electron microscope H-7500 manufactured by Hitachi High-Technologies Corporation at an accelerating voltage of 100 kV, and an enlarged photograph of a cross-section of the carbon black was taken. The cross-section of the carbon black was arbitrarily selected. The magnification of the enlarged photograph was 10,000 times. The TEM image obtained by the photographing described above was converted into 2-value image data using image analysis software Image-ProPlus (manufactured by Media Cybernetics, Inc.). In the data, only the carbon black particles were randomly analyzed. The average primary particle diameter of the carbon black was determined by randomly selecting 100 primary particles and determining the number average particle diameter of the particles as the average primary particle diameter.

Method for Measuring Electric Resistance

In the apparatus for measuring the electric resistance, Loresta-GP MCP-T610 model (manufactured by Mitsubishi Chemical Analytech Co., Ltd., being in accordance with JIS-K7194) was used as the resistivity meter, and a series 4-pin probe was used as the electrode. The measurement was performed at an application voltage of 10 V, and the electric resistance was measured at five points with 100 mm intervals in the center portion in width direction of the sheet, and the average thereof used as the measurement data.

The measurement environment was 25° C.±3° C. and a relative humidity of 55%±5%.

Method for Evaluating Moldability

Moldability was evaluated by measuring thicknesses at 50 points with 100 mm intervals in the center portion in the width direction of the sheet, and a sample formed into a sheet including lump portions (aggregation portions) having a thickness irregularity of within ±5% was graded as A, a sample formed into a sheet including lump portions having a thickness irregularity of within ±10% was graded as B, a sample formed into a sheet including lump portions having a thickness irregularity of within ±20% was graded as C, and a sample formed into a sheet including lump portions having a thickness irregularity of higher than ±20% was graded as D. Grade C and higher were defined as acceptable.

Peel Test

A peel test was performed in accordance with JIS K6854-1 using a tension tester (manufactured by Instron, model: 5582) at a head speed of 10 mm/min. The test was performed five times, and the average of maximum peel forces was defined as adhesive strength (N/25 mm).

Evaluation of Peeling of Surface Layer

Five test pieces were visually observed to verify the presence or absence of peeling of the resin layer from the base material. The criteria were as follows, and grades A and B were defined as acceptable.

A: no peeling of resin layer was observed;

B: peeling of resin layer was observed in one of five pieces; and

C: peeling of resin layer was observed in two or more of five pieces.

EXAMPLES

Example 1

Production of Resin Composition

As the ethylene-vinyl acetate copolymer resin, Evaflex P1007 (A-1) (MFR: 9 g/10 min, vinyl acetate content: 10 mass %) manufactured by Du Pont-Mitsui Polychemicals Co., Ltd. was used.

As carbon black, Seast G-FY (B-1) (average primary particle diameter: 72 nm, DBP oil absorption amount: 152 mL/100 g) manufactured by Tokai Carbon Co., Ltd. was used.

(A-1) and (B-1) were mixed in amounts of 57 mass % (A-1) and 43 mass % (B-1), and were agitated with a tumbler for 10 minutes to prepare a mixture. The resulting mixture was kneaded with a kneader (twin-screw kneader PCM-30, manufactured by Ikegai Corporation) to prepare a pellet-shaped resin composition.

Sheet Molding

The resulting resin composition was molded by extrusion molding using a sheet extruder, which is a single screw extruder (manufactured by Research Laboratory of Plastics Technology Co., Ltd., trade name: GT-40) connected to a coat hanger die having a width of 300 mm, to prepare a sheet-like resin molded product having a thickness of 100 μm of Example 1.

Evaluation of Sample

The surface resistivity of the resulting sheet-like resin molded product was measured, and it was confirmed that a good conductivity of 560 Ω/□ was obtained. In addition, in the sheet, no holes were observed, lumps were hardly observed, the difference between the maximum and minimum thickness irregularities was 8 μm, and the thickness irregularity relative to the average film thickness was ±5% or less. Thus, a good sheet was obtained, the resin molded product was evaluated as A.

Examples 2 to 16

In Examples 2 to 16, the ethylene-vinyl acetate copolymer resin material and the carbon black material and the compounding ratios thereof were changed as shown in Table 1, and resin molded products were prepared as in Example 1. The results of evaluation of the resin molded product of each Example are summarized in Table 2. Incidentally, although a modification example containing 5 parts by mass of a thermoplastic elastomer (olefin elastomer manufactured by Sumitomo Chemical Co., Ltd., trade name: ESPOLEX TPE820) in addition to the components of the resin molded product of Example 2 was also produced, no changes were observed in the resistivity and the moldability.

Here, the materials used were as follows:

(A) Ethylene-vinyl acetate copolymer resin (EVA material)

A-1: Evaflex P1007 manufactured by Du Pont-Mitsui Polychemicals Co., Ltd.
MFR: 9 g/10 min, vinyl acetate content: 10%

A-2: Evaflex EV460 manufactured by Du Pont-Mitsui Polychemicals Co., Ltd.
MFR: 2.5 g/10 min, vinyl acetate content: 19%

A-3: Evaflex EV450 manufactured by Du Pont-Mitsui Polychemicals Co., Ltd.
MFR: 15 g/10 min, vinyl acetate content: 19%

A-4: UBE Polyethylene V115 manufactured by Ube-Maruzen Polyethylene Co., Ltd.
MFR: 0.8 g/10 min, vinyl acetate content: 15%

A-5: Evaflex V406 manufactured by Du Pont-Mitsui Polychemicals Co., Ltd.
MFR: 20 g/10 min, vinyl acetate content: 20%

A-6: UBE polyethylene V315 manufactured by Ube-Maruzen Polyethylene Co., Ltd.
MFR: 17 g/10 min, vinyl acetate content: 15%

A-7: UBE polyethylene V206 manufactured by Ube-Maruzen Polyethylene Co., Ltd.
MFR: 2 g/10 min, vinyl acetate content: 6%

A-8: UBE polyethylene V106 manufactured by Ube-Maruzen Polyethylene Co., Ltd.
MFR: 0.4 g/10 min, vinyl acetate content: 6%

A-9: Evaflex V250 manufactured by Du Pont-Mitsui Polychemicals Co., Ltd.
MFR: 15 g/10 min, vinyl acetate content: 28%

A-10: Novatec LV113 manufactured by Japan Polyethylene Corporation
MFR: 0.3 g/10 min, vinyl acetate content: 4%

A-11: Evaflex V250 manufactured by Du Pont-Mitsui Polychemicals Co., Ltd.
MFR: 30 g/10 min, vinyl acetate content: 33%

A-12: UBE polyethylene V210 manufactured by Ube-Maruzen Polyethylene Co., Ltd.
MFR: 4 g/10 min, vinyl acetate content: 10%

A-13: Evaflex P1007 manufactured by Du Pont-Mitsui Polychemicals Co., Ltd.
MFR: 9 g/10 min, vinyl acetate content: 10%

A-14: Evaflex V56113 manufactured by Du Pont-Mitsui Polychemicals Co., Ltd.
MFR: 20 g/10 min, vinyl acetate content: 12%

A-15: UBE polyethylene V215 manufactured by Ube-Maruzen Polyethylene Co., Ltd.
MFR: 2 g/10 min, vinyl acetate content: 15%

A-16: UBE polyethylene V105T manufactured by Ube-Maruzen Polyethylene Co., Ltd.
MFR: 15 g/10 min, vinyl acetate content: 5%

A-17: UBE polyethylene V322 manufactured by Ube-Maruzen Polyethylene Co., Ltd.
MFR: 3 g/10 min, vinyl acetate content: 22%

A-18: UBE polyethylene V221 manufactured by Ube-Maruzen Polyethylene Co., Ltd.
MFR: 2.5 g/10 min, vinyl acetate content: 21%

A-19: Novatec LV1511 manufactured by Japan Polyethylene Corporation
MFR: 3 g/10 min, vinyl acetate content: 1.5%

A-20: UBE polyethylene V120T manufactured by Ube-Maruzen Polyethylene Co., Ltd.
MFR: 1.0 g/10 min, vinyl acetate content: 20%

A-21: Evaflex EV-150 manufactured by Du Pont-Mitsui Polychemicals Co., Ltd.
MFR: 30.0 g/10 min, vinyl acetate content: 33%

(B) Carbon black (CB material)

B-1: Seast G-FY manufactured by Tokai Carbon Co., Ltd.
Average primary particle diameter: 72 nm, DBP oil absorption amount: 152 mL/100 g B-2: Toka Black #4300 manufactured by Tokai Carbon Co., Ltd.
Average primary particle diameter: 55 nm, DBP oil absorption amount: 142 mL/100 g B-3: Denka Black Granule manufactured by Denka Co., Ltd.
Average primary particle diameter: 35 nm, DBP oil absorption amount: 160 mL/100 g B-4: Toka Black #8500F manufactured by Tokai Carbon Co., Ltd.
Average primary particle diameter: 14 nm, DBP oil absorption amount: 96 mL/100 g B-5: Toka Black #7050 manufactured by Tokai Carbon Co., Ltd.
Average primary particle diameter: 66 nm, DBP oil absorption amount: 67 mL/100 g B-6: Toka Black #5500 manufactured by Tokai Carbon Co., Ltd.
Average primary particle diameter: 25 nm, DBP oil absorption amount: 155 mL/100 g B-7: Seast TA manufactured by Tokai Carbon Co., Ltd.
Average primary particle diameter: 122 nm, DBP oil absorption amount: 42 mL/100 g (C) PS resin
C-1: NR1200 manufactured by Toyo Styrene Co., Ltd.

(D) Additive
D-1: 50 mass % ethanol dilution of Chirabazol H-818 (main component: polyglycerol condensed fatty acid ester) manufactured by Taiyo Kagaku Co., Ltd.

TABLE 1

| | EVA material | | | CB material | | Compounding ratio | | Vinyl acetate content in resin |
|---|---|---|---|---|---|---|---|---|
| | | | | Average | | | | |
| | | | Vinyl acetate | DBP oil absorption | primary particle | | | |
| | | MFR | content | | amount | diameter | EVA | CB | composition |
| | Type | (g/10 min) | (mass %) | Type | (ml/100 g) | (nm) | (mass %) | (mass %) | (mass %) |
| Example 1 | A-1 | 9 | 10 | B-1 | 152 | 72 | 57 | 43 | 5.7% |
| Example 2 | A-1 | 9 | 10 | B-1 | 152 | 72 | 57 | 43 | 5.7% |
| Example 3 | A-1 | 9 | 1 | B-1 | 152 | 72 | 57 | 43 | 5.7% |
| Example 4 | A-2 | 2.5 | 19 | B-1 | 152 | 72 | 57 | 43 | 10.8% |
| Example 5 | A-3 | 15 | 19 | B-1 | 152 | 72 | 57 | 43 | 10.8% |
| Example 6 | A-4 | 0.8 | 15 | B-2 | 142 | 55 | 57 | 43 | 8.6% |
| Example 7 | A-5 | 20 | 20 | B-2 | 142 | 55 | 57 | 43 | 11.4% |
| Example 8 | A-6 | 17 | 15 | B-2 | 142 | 55 | 57 | 43 | 8.6% |
| Example 9 | A-7 | 2 | 6 | B-2 | 142 | 55 | 57 | 43 | 3.4% |
| Example 10 | A-12 | 4 | 10 | B-1 | 152 | 72 | 56 | 44 | 5.6% |
| Example 11 | A-13 | 9 | 10 | B-1 | 152 | 72 | 58 | 42 | 5.8% |
| Example 12 | A-14 | 20 | 12 | B-1 | 152 | 72 | 57 | 43 | 6.8% |
| Example 13 | A-15 | 2 | 15 | B-1 | 152 | 72 | 57 | 43 | 8.6% |
| Example 14 | A-16 | 15 | 5 | B-1 | 152 | 72 | 58 | 42 | 2.9% |
| Example 15 | A-17 | 3 | 22 | B-1 | 152 | 72 | 56 | 44 | 12.3% |
| Example 16 | A-18 | 2.5 | 21 | B-1 | 152 | 72 | 55 | 45 | 11.6% |

TABLE 2

Table 2

| | Resin molded product | | | |
|---|---|---|---|---|
| | Film thickness (μm) | Resistivity (Ω/□) | Moldability | Film thickness irregularity (μm) |
| Example 1 | 100 | 560 | A | 8 |
| Example 2 | 200 | 510 | A | 17 |
| Example 3 | 50 | 650 | A | 2 |
| Example 4 | 100 | 600 | A | 7 |
| Example 5 | 100 | 500 | B | 13 |
| Example 6 | 100 | 560 | B | 17 |
| Example 7 | 100 | 460 | A | 6 |
| Example 8 | 100 | 510 | A | 8 |
| Example 9 | 100 | 620 | C | 34 |
| Example 10 | 100 | 550 | A | 8 |
| Example 11 | 100 | 570 | A | 7 |
| Example 12 | 100 | 600 | A | 9 |
| Example 13 | 100 | 520 | A | 8 |
| Example 14 | 100 | 620 | B | 14 |
| Example 15 | 100 | 720 | A | 8 |
| Example 16 | 100 | 690 | A | 8 |

Comparative Example 1

Production of Resin Composition

As the ethylene-vinyl acetate copolymer resin, UBE polyethylene V106 (A-8) (MFR: 0.4 g/10 min, vinyl acetate content: 6 mass %) manufactured by Ube-Maruzen Polyethylene Co., Ltd. was used.

As the carbon black, Seast G-FY (B-1) (average primary particle diameter: 72 nm, DBP oil absorption amount: 152 mL/100 g) manufactured by Tokai Carbon Co., Ltd. was used.

(A-8) and (B-1) were mixed in amounts of 57 mass % (A-8) and 43 mass % (B-1), and were agitated with a tumbler for 10 minutes to prepare a mixture. The resulting mixture was kneaded with a kneader (twin-screw kneader PCM-30, manufactured by Ikegai Corporation) to prepare a pellet-shaped resin composition.

Sheet Molding

A sheet-like resin molded product of Comparative Example 1 was prepared as in Example 1.

Evaluation of Sample

The surface resistivity of the resulting sheet-like resin molded product sample was measured to be 640 Ω/□. In the sheet, a large number of lumps probably due to aggregation of the carbon black were observed in the sheet, the difference between the maximum and minimum thickness irregularities was 55 μm, and the thickness irregularity exceeded ±20%. Therefore, the sheet was evaluated as D.

Comparative Examples 2 to 12

In Comparative Examples 2 to 12, the ethylene-vinyl acetate copolymer resin material and the carbon black material and the compounding ratios thereof were changed as shown in Table 3, and resin molded products were prepared as in Comparative Example 1. The results of evaluation of the resin molded product of each Example are summarized in Table 4.

TABLE 3

| | EVA material | | | CB material | | Compounding ratio | | Vinyl acetate content in resin composition (mass %) |
| --- | --- | --- | --- | --- | --- | --- | --- | --- |
| | Type | MFR (g/10 min) | Vinyl acetate content (mass %) | Type | DBP oil absorption amount (ml/100 g) | Average primary particle diameter (nm) | EVA (mass %) | CB (mass %) | |
| Comparative Example 1 | A-8 | 0.4 | 6 | B-1 | 152 | 72 | 57 | 43 | 3.4% |
| Comparative Example 2 | A-9 | 15 | 28 | B-1 | 152 | 72 | 60 | 40 | 16.8% |
| Comparative Example 3 | A-9 | 15 | 28 | B-1 | 152 | 72 | 57 | 43 | 16.0% |
| Comparative Example 4 | A-10 | 0.3 | 4 | B-2 | 142 | 55 | 57 | 43 | 2.3% |
| Comparative Example 5 | A-11 | 30 | 33 | B-2 | 142 | 55 | 57 | 43 | 18.8% |
| Comparative Example 6 | A-1 | 9 | 10 | B-3 | 160 | 35 | 57 | 43 | 5.7% |
| Comparative Example 7 | A-1 | 9 | 10 | B-4 | 96 | 14 | 57 | 43 | 5.7% |
| Comparative Example 8 | A-3 | 15 | 19 | B-4 | 96 | 14 | 55 | 45 | 10.5% |
| Comparative Example 9 | A-1 | 9 | 10 | B-6 | 155 | 25 | 57 | 43 | 5.7% |
| Comparative Example 10 | A-1 | 9 | 10 | B-7 | 42 | 122 | 57 | 43 | 5.7% |
| Comparative Example 11 | A-3 | 15 | 19 | B-7 | 42 | 122 | 50 | 50 | 9.5% |
| Comparative Example 12 | A-19 | 3 | 1.5 | B-1 | 152 | 72 | 57 | 43 | 0.9% |

TABLE 4

| | Resin molded product | | | |
| --- | --- | --- | --- | --- |
| | Film thickness (μm) | Resistivity (Ω/□) | Moldability | Film thickness irregularity (μm) |
| Comparative Example 1 | 100 | 640 | D | 55 |
| Comparative Example 2 | 100 | 1120 | B | 18 |
| Comparative Example 3 | 100 | 750 | B | 16 |
| Comparative Example 4 | 100 | 580 | D | 63 |
| Comparative Example 5 | 100 | 1850 | D | 52 |
| Comparative Example 6 | 100 | 610 | D | 48 |
| Comparative Example 7 | 100 | 1210 | D | 56 |
| Comparative Example 8 | 410 | 750 | D | 221 |
| Comparative Example 9 | 100 | 860 | D | 62 |
| Comparative Example 10 | 280 | 670 | D | 152 |
| Comparative Example 11 | 360 | 420 | D | 243 |
| Comparative Example 12 | 200 | 690 | D | 142 |
| Comparative Example 13 | 370 | 640 | D | 286 |
| Comparative Example 14 | 100 | 620 | D | 49 |

In Comparative Examples 1 and 4, since the MFR of the ethylene-vinyl acetate copolymer resin was lower than 0.5 g/10 min, the moldability was poor. In particular, in Comparative Example 4, a hole was formed in the sheet.

In Comparative Examples 2, 3, and 5, since the content of vinyl acetate was higher than 12.3 parts by mass, the resistivity was high.

In Comparative Examples 6 and 9, since the average primary particle diameter of the carbon black was smaller than 55 nm, the moldability was poor. In particular, in Comparative Example 6, a hole was formed in the sheet.

In Comparative Examples 7 and 8, since the oil absorption amount of the carbon black was smaller than 100 mL/100 g and the average primary particle diameter was smaller than 55 nm, the resistivity was high, and the moldability was also poor.

In Comparative Examples 10 and 11, since the oil absorption amount of the carbon black was smaller than 100 mL/100 g and the average primary particle diameter was larger than 100 nm, the moldability was poor, and a hole was formed in the sheet.

In Comparative Example 12, since the content of the vinyl acetate was less than 2.9 parts by mass based on 100 parts by mass of the main component, the moldability was poor.

From the above, it was revealed that a resin molded product whose main component consists of an ethylene-vinyl acetate copolymer resin and carbon black can achieve both high conductivity and moldability when satisfying the following requirements (1) to (3):

(1) the ethylene-vinyl acetate copolymer resin has an MFR of 0.5 g/10 min or more and 20 g/10 min or less, (2) the carbon black has an average primary particle diameter of 55 nm or more and 100 nm or less, and (3) the content of vinyl acetate is 2.9 parts by mass or more and 12.3 parts by mass or less based on 100 parts by mass of the main component.

Example 17

Manufacture of Sheet-Like Resin Molded Product to be Used in Resin Layer

As the ethylene-vinyl acetate copolymer resin material, UBE polyethylene V115 (A-4) (MFR: 0.8 g/10 min, vinyl acetate content: 15 mass %) manufactured by Ube-Maruzen Polyethylene Co., Ltd. was used.

As the carbon black material, Seast G-FY (B-5) manufactured by Tokai Carbon Co., Ltd. was used.

In addition, as an additive, 50 mass % ethanol dilution of Chirabazol H-818 (D-1) (main component: polyglycerol condensed fatty acid ester) manufactured by Taiyo Kagaku Co., Ltd. was used.

(A-4), (B-5), and (D-1) were mixed in amounts of 58 mass % (A-4), 40 mass % (B-5), and 2 mass % (D-1), and were agitated with a tumbler for 10 minutes to prepare a mixture. The resulting mixture was melt-kneaded with a kneader (twin-screw kneader PCM-30, manufactured by Ikegai Corporation) at a cylinder temperature of 180° C., and a pellet-shaped resin composition was prepared by using a strand cutter. The resulting pellet-shaped resin composition was extruded from a T-die at a cylinder temperature of 160° C. onto a cooling drum with a single-screw kneading extruder (FS30, manufactured by Ikegai Corporation) for extrusion molding into a sheet shape having a thickness of 100 μm. A sheet-like resin molded product was thus prepared.

Manufacture of Resin Laminate

The resulting sheet-like resin molded product was cut to a length of 150 mm and a width of 25 mm and was pasted to a plate-like mold having a length of 250 mm, a width of 250 mm, and a thickness of 3 mm. Subsequently, insert molding was performed by injecting NR 1200 (C-1) manufactured by Toyo Styrene Co., Ltd., which is a polystyrene resin, as the base material with an injection molding machine (SE-180D, manufactured by Sumitomo Heavy Industries, Ltd.) to prepare a resin laminate of Example 17 as a test piece for peel test. The temperature conditions for the insert molding were a cylinder temperature of 200° C. and a mold temperature of 50° C.

As in above, the resulting sheet-like resin molded product was cut to a length of 80 mm and a width of 14 mm and was pasted to a mold for a rectangular test piece type B1 (length 80 mm×width 10 mm×thickness 4 mm) defined by JIS K7152-1 so as to stride the long side of the mold. Subsequently, as in the test piece for peel test, insert molding was performed by injecting a polystyrene resin (C-1) as the base material with an injection molding machine (SE-180D, manufactured by Sumitomo Heavy Industries, Ltd.) to prepare a resin laminate of Example 17 as a test piece for evaluation of surface layer delamination. Here, the thickness of the base material was set to 300 μm. The temperature conditions for the insert molding were a cylinder temperature of 200° C. and a mold temperature of 50° C.

Results of Evaluation

In evaluation of five test pieces for peel test, the adhesive strength of the resin laminate of Example 17 was high, 3.2 (N/25 mm). In addition, in evaluation of five test pieces for evaluating surface layer delamination, no peeling was observed, and the resin laminate was therefore evaluated as A.

Examples 18 to 22

In Examples 18 to 22, the ethylene-vinyl acetate copolymer resin material, the carbon black material, and the additive material and the compounding ratios thereof were changed as shown in Table 5, and resin laminates were prepared as in Example 17. The results of evaluation of the resin laminate of each Example are summarized in Table 6. Incidentally, although a modification example 1 in which the thickness of the base material of Example 18 was changed to 1 mm was produced, the results were the same as those in Example 18. Furthermore, although a modification example 2 in which the conductive filler of Example 19 was changed to carbon black, Seast TA (B-7), the results were the same as those in Example 19.

TABLE 5

| | EVA material | | | Compounding ratio | | | Vinyl acetate content in resin layer (mass %) |
|---|---|---|---|---|---|---|---|
| | Type | MFR (g/10 min) | Vinyl acetate content (mass %) | EVA (mass %) | CB (mass %) | Additive (mass %) | |
| Example 17 | A-4 | 0.8 | 15 | 58.0 | 40.0 | 2.0 | 8.7% |
| Example 18 | A-16 | 1.0 | 5.5 | 58.0 | 40.0 | 2.0 | 3.2% |
| Example 19 | A-20 | 1.0 | 20 | 58.0 | 40.0 | 2.0 | 11.6% |
| Example 20 | A-16 | 1.0 | 5.5 | 68.5 | 30.0 | 1.5 | 3.8% |
| Example 21 | A-16 | 1.0 | 5.5 | 52.8 | 45.0 | 2.2 | 2.9% |
| Example 22 | A-3 | 15.0 | 6 | 58.0 | 40.0 | 2.0 | 3.5% |
| Comparative Example 13 | A-21 | 30.0 | 33 | 58.0 | 40.0 | 2.0 | 19.1% |

TABLE 7

Table 7

| | Resin laminate | |
|---|---|---|
| | Adhesive strength (N/25 mm) | Evaluation of delamination |
| Example 17 | 3.5 | A |
| Example 18 | 4.6 | A |
| Example 19 | 4.8 | A |
| Example 20 | 3.2 | A |
| Example 21 | 3.1 | A |
| Example 22 | 1.2 | B |
| Comparative Example 13 | 0.6 | C |

Comparative Example 13

Manufacture of Sheet-Like Resin Molded Product to be Used in Resin Layer

As the ethylene-vinyl acetate copolymer resin material, Evaflex EV-150 (A-21) (MFR: 30.0 g/10 min, vinyl acetate content: 33 mass %) manufactured by Du Pont-Mitsui Polychemicals Co., Ltd. was used.

As the carbon black material, Seast G-FY (B-1) manufactured by Tokai Carbon Co., Ltd. was used.

As the additive, 50 mass % ethanol dilution of Chirabazol H-818 (D-1) (main component: polyglycerol condensed fatty acid ester) manufactured by Taiyo Kagaku Co., Ltd. was used.

(A-21), (B-1), and (D-1) were mixed in amounts of 58 mass % (A-21), 40 mass % (B-1), and 2 mass % (D-1), and were agitated with a tumbler for 10 minutes to prepare a mixture. The resulting mixture was melt-kneaded with a kneader (twin-screw kneader PCM-30, manufactured by Ikegai Corporation) at a cylinder temperature of 180° C., and a pellet-shaped resin composition was prepared by using a strand cutter. The resulting pellet-shaped resin composition was extruded from a T-die at a cylinder temperature of 160° C. onto a cooling drum with a single-screw kneading extruder (FS30, manufactured by Ikegai Corporation) for extrusion molding into a sheet shape having a thickness of 100 μm. A sheet-like resin molded product was thus prepared.

Manufacture of Resin Laminate

The resulting sheet-like resin molded product was cut to a length of 150 mm and a width of 25 mm and was pasted to a plate-like mold having a length of 250 mm, a width of 250 mm, and a thickness of 3 mm. Subsequently, insert molding was performed by injecting NR 1200 (C-1) manufactured by Toyo Styrene Co., Ltd., which is a polystyrene resin, as the base material with an injection molding machine (SE-180D, manufactured by Sumitomo Heavy Industries, Ltd.) to prepare a resin laminate of Comparative Example 13 as a test piece for peel test. The temperature conditions for the insert molding were a cylinder temperature of 200° C. and a mold temperature of 50° C. In addition, as in above, the resulting sheet-like resin molded product was cut to a length of 80 mm and a width of 14 mm and was pasted to a mold for a rectangular test piece type B1 (length 80 mm×width 10 mm×thickness 4 mm) defined by JIS K7152-1 so as to stride the long side of the mold. Subsequently, as in the test piece for peel test, insert molding was performed by injecting a polystyrene resin (C-1) as the base material using an injection molding machine (SE-180D, manufactured by Sumitomo Heavy Industries, Ltd.) to prepare a resin laminate of Comparative Example 13 as a test piece for evaluation of surface layer delamination. The temperature conditions for the insert molding were a cylinder temperature of 200° C. and a mold temperature of 50° C.

Results of Evaluation

In evaluation of five test pieces for peel test, the adhesive strength of the resin laminate of Comparative Example 13 was 0.6 (N/25 mm), which was low compared to that in each Example. In addition, in evaluation of five test pieces for evaluating surface layer delamination, peeling was observed in four test pieces, and the resin laminate was therefore evaluated as C.

The above results are summarized that in Examples 17 to 22 in which the MFRs of the ethylene-vinyl acetate copolymer resins were 0.5 g/10 min or more and 20 g/10 min or less, the adhesive strength was high and peeling hardly occurred, compared to Comparative Example 13 in which the MFR was higher than 20 g/10 min.

According to the present disclosure, the resin molded product whose main component consists of an ethylene-vinyl acetate copolymer resin and carbon black can mitigate the increase in viscosity due to the carbon black by the ethylene-vinyl acetate copolymer resin, while expressing high conductivity by the carbon black, and can obtain high moldability. Accordingly, it is possible to provide a resin molded product having both high conductivity and moldability.

According to the present disclosure, the ethylene-vinyl acetate copolymer resin has excellent moldability and is easily entangles with the polymer chain of the polystyrene resin. Accordingly, a resin laminate having excellent molding accuracy and sufficient adhesive strength can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-128438, filed Jul. 5, 2018, No. 2018-128439, filed Jul. 5, 2018, and No. 2019-094048, filed May 17, 2019, which are hereby incorporated by reference herein in their entirety.

What is claimed is:

1. A resin laminate comprising:
   a base material made of a polystyrene resin; and
   a resin layer provided on the base material and including a main component consisting of an ethylene-vinyl acetate copolymer resin and carbon black,
   wherein
   the ethylene-vinyl acetate copolymer resin has a melt flow rate of 0.8 g/10 min or more and 15 g/10 min or less,
   the content of the vinyl acetate is 2.9 parts by mass or more and 11.6 parts by mass or less based on 100 parts by mass of the main components,
   the content of the vinyl acetate is 5.5 parts by mass or more and 20 parts by mass or less based on 100 parts by mass of the ethylene-vinyl acetate copolymer resin,
   the content of the carbon black is 30 parts by mass or more and 45 parts by mass or less based on 100 parts by mass of the main component, and
   the content of the ethylene-vinyl acetate copolymer resin is 52.8 parts by mass or more and 68.5 parts by mass or less based on 100 parts by mass of the main component.

2. The resin laminate according to claim 1, wherein the resin layer has a thickness of 30 μm or more and 200 μm or less.

3. The resin laminate according to claim 1, wherein a ratio of the thickness t1 of the base material to the thickness t2 of the resin layer, t1/t2, is 1.5 or more and 20 or less.

4. The resin laminate according to claim 1, wherein the carbon black has an average primary particle diameter of 66 nm or more and 122 nm or less.

5. The resin laminate according to claim 1, wherein the carbon black has a dibutyl phthalate oil absorption amount of 42 mL/100 g or more and 67 mL/100 g or less.

6. A cartridge comprising:
   a frame;
   an electrostatic capacitance detection member provided on the frame; and a contact member electrically connected to the electrostatic capacitance detection member, wherein the frame is made of a polystyrene resin; and the electrostatic capacitance detection member includes a main component consisting of an ethylene-vinyl acetate copolymer resin and carbon black, where the ethylene-vinyl acetate copolymer resin has a melt flow rate of 0.8 g/10 min or more and 15 g/10 min or less, the content of the vinyl acetate is 2.9 parts by mass or more and 11.6 parts by mass or less based on 100 parts by mass of the main components, the content of the vinyl acetate is 5.5 parts by mass or more and 20 parts by mass or less based on 100 parts by mass of the ethylene-vinyl acetate copolymer resin, the content of the carbon black is 30 parts by mass or more and 45 parts by mass or less based on 100 parts by mass of the main component, and the content of the ethylene-vinyl acetate copolymer resin is 52.8 parts by mass or more and 68.5 parts by mass or less based on 100 parts by mass of the main component.

7. An image-forming apparatus comprising:

a developer residual amount detecting unit, wherein the developer residual amount-detecting unit is electrically connected to the contact member of the cartridge according to claim 6.

8. A method for manufacturing a resin laminate including a base material made of a polystyrene resin and a resin layer including a main component consisting of an ethylene-vinyl acetate copolymer resin and carbon black on the base material, the method comprising:

preparing a resin composition by mixing an ethylene-vinyl acetate copolymer resin having a melt flow rate of 0.8 g/10 min or more and 15 g/10 min or less and carbon black, wherein the content of the vinyl acetate is 2.9 parts by mass or more and 11.6 parts by mass or less based on 100 parts by mass of the main components, wherein the content of the vinyl acetate is 5.5 parts by mass or more and 20 parts by mass or less based on 100 parts by mass of the ethylene-vinyl acetate copolymer resin, wherein the content of the carbon black is 30 parts by mass or more and 45 parts by mass or less based on 100 parts by mass of the main component, and wherein the content of the ethylene-vinyl acetate copolymer resin is 52.8 parts by mass or more and 68.5 parts by mass or less based on 100 parts by mass of the main component;

molding the resin composition by extrusion molding to prepare a sheet-shaped resin molded product; and placing the sheet-shaped resin molded product in a mold and injecting a molten polystyrene resin into the mold to perform insert molding.

9. A method for manufacturing a resin laminate including a base material made of a polystyrene resin and a resin layer including a main component consisting of an ethylene-vinyl acetate copolymer resin and carbon black on the base material, the method comprising:

preparing a base material made of a polystyrene resin; and providing a resin layer including a main component consisting of an ethylene-vinyl acetate copolymer resin and carbon black on the base material, wherein the ethylene-vinyl acetate copolymer resin has a melt flow rate of 0.8 g/10 min or more and 15 g/10 min or less, the content of the vinyl acetate is 2.9 parts by mass or more and 11.6 parts by mass or less based on 100 parts by mass of the main components, the content of the vinyl acetate is 5.5 parts by mass or more and 20 parts by mass or less based on 100 parts by mass of the ethylene-vinyl acetate copolymer resin, the content of the carbon black is 30 parts by mass or more and 45 parts by mass or less based on 100 parts by mass of the main component, and the content of the ethylene-vinyl acetate copolymer resin is 52.8 parts by mass or more and 68.5 parts by mass or less based on 100 parts by mass of the main component.

\* \* \* \* \*